United States Patent
Lee et al.

(10) Patent No.: US 11,410,347 B2
(45) Date of Patent: Aug. 9, 2022

(54) NODE-BASED IMAGE COLORIZATION ON IMAGE/VIDEO EDITING APPLICATIONS

(71) Applicant: SONY GROUP CORPORATION, Tokyo (JP)

(72) Inventors: Jong Hwa Lee, San Diego, CA (US); Moises Tafolla, San Diego, CA (US); Praggya Garg, San Diego, CA (US); Allison Langley, San Diego, CA (US); Gary Lyons, San Diego, CA (US); Alexander Stoneham, San Diego, CA (US); Seunghan Kim, San Diego, CA (US); Luis Vasconcelos, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/196,030

(22) Filed: Mar. 9, 2021

(65) Prior Publication Data
US 2021/0319596 A1    Oct. 14, 2021

Related U.S. Application Data

(60) Provisional application No. 63/008,958, filed on Apr. 13, 2020.

(51) Int. Cl.
*G06T 11/00* (2006.01)
*G06F 3/048* (2013.01)
*G06F 3/0484* (2022.01)

(52) U.S. Cl.
CPC .......... *G06T 11/001* (2013.01); *G06F 3/0484* (2013.01)

(58) Field of Classification Search
CPC ..... G06T 11/001; G06F 3/0484; H04N 3/127; G09G 3/2007; G09G 3/3607; G09G 5/04; G09G 5/006; G09G 2320/02
See application file for complete search history.

(56) References Cited

U.S. PATENT DOCUMENTS

| | | | |
|---|---|---|---|
| 2004/0125124 A1* | 7/2004 | Kim | G06F 16/7847 |
| 2006/0028483 A1* | 2/2006 | Kondo | G09G 5/02 345/594 |
| 2012/0242790 A1 | 9/2012 | Sandrew et al. | |
| 2018/0150947 A1 | 5/2018 | Lu et al. | |
| 2018/0367773 A1* | 12/2018 | Holub | G06T 7/80 |
| 2019/0268580 A1 | 8/2019 | Niitsuma et al. | |

* cited by examiner

*Primary Examiner* — Wesner Sajous
(74) *Attorney, Agent, or Firm* — Chip Law Group

(57) ABSTRACT

A system and method for node-based image colorization is provided. The system receives a first user input via a Graphical User Interface (GUI) of an image/video editing application and controls a display device to display a node graph on the GUI based on the first user input. The node graph includes an input node to select grayscale images and a colorization node which may represent a workflow for colorization of at least a first object in the grayscale images. The system receives a second user input associated with a setting of the colorization node and selects an image colorization model based on the second user input. The system executes the workflow associated with the colorization node to transmit the grayscale images to a computing device that hosts the selected image colorization model, and to receive colorized images including at least the first object colorized based on a color effect.

20 Claims, 6 Drawing Sheets

NODE-BASED IMAGE COLORIZATION ON IMAGE/VIDEO EDITING APPLICATIONS

CROSS-REFERENCE TO RELATED APPLICATIONS/INCORPORATION BY REFERENCE

This application claims priority to U.S. Provisional Patent Application Ser. No. 63/008,958 filed on Apr. 13, 2020, the entire content of which is hereby incorporated herein by reference.

FIELD

Various embodiments of the disclosure relate to image/video colorization. More specifically, various embodiments of the disclosure relate to a system and method for node-based image colorization on an image/video editing application.

BACKGROUND

Advancements in image/video editing applications have led to development of image colorization techniques which add color to one or more regions in a grayscale image/video. In conventional image colorization methods, a user has to manually select a region of interest in an image frame of a video. To colorize the entire sequence of frames in the video, the above process has to be repeated manually for every frame of the video. This may be time consuming and cumbersome for the user.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for node-based image colorization on image/video editing applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for node-based image colorization on an image/video editing application. Exemplary aspects of the disclosure provide a system which implements a workflow using an image colorization model for colorization of at least one object in one or more grayscale images. Specifically, the image colorization model applies a color effect on at least one object in one or more grayscale images.

The image/video editing application may provide a user with the capability to select the image colorization model which may be hosted on a computing device. For example, the user may select a neural network-based colorization model (such as a user-guided colorization option) which may require a reference color image as input to colorize the one or more grayscale images, or another neural network-based colorization model (such as an auto-style colorization option), which may be capable of colorizing the one or more grayscale images without a reference color image as an input to the selected image colorization model. The same application provides a node-based interface to display a node graph. For example, a user may simply select the one or more grayscale images as an input node to a colorization node, the output of which may be linked to a result node. The colorization node may correspond to a software plugin (such as an OpenFX (OFX) plugin) which, when executed, may invoke the image colorization model to apply the color effect to object(s) in the grayscale image(s). Thus, the present disclosure does not require the user to mark any region of interest in every frame of a target grayscale video. The user may simply have to select a target image or video (with grayscale image(s)) as input to a colorization node on a node-based interface of the image/video editing application, and an image colorization model. The colorization node may represent a workflow, which when executed, may invoke the image colorization model to apply a color effect to object(s) in the frames of the target image/video.

Figure 1:
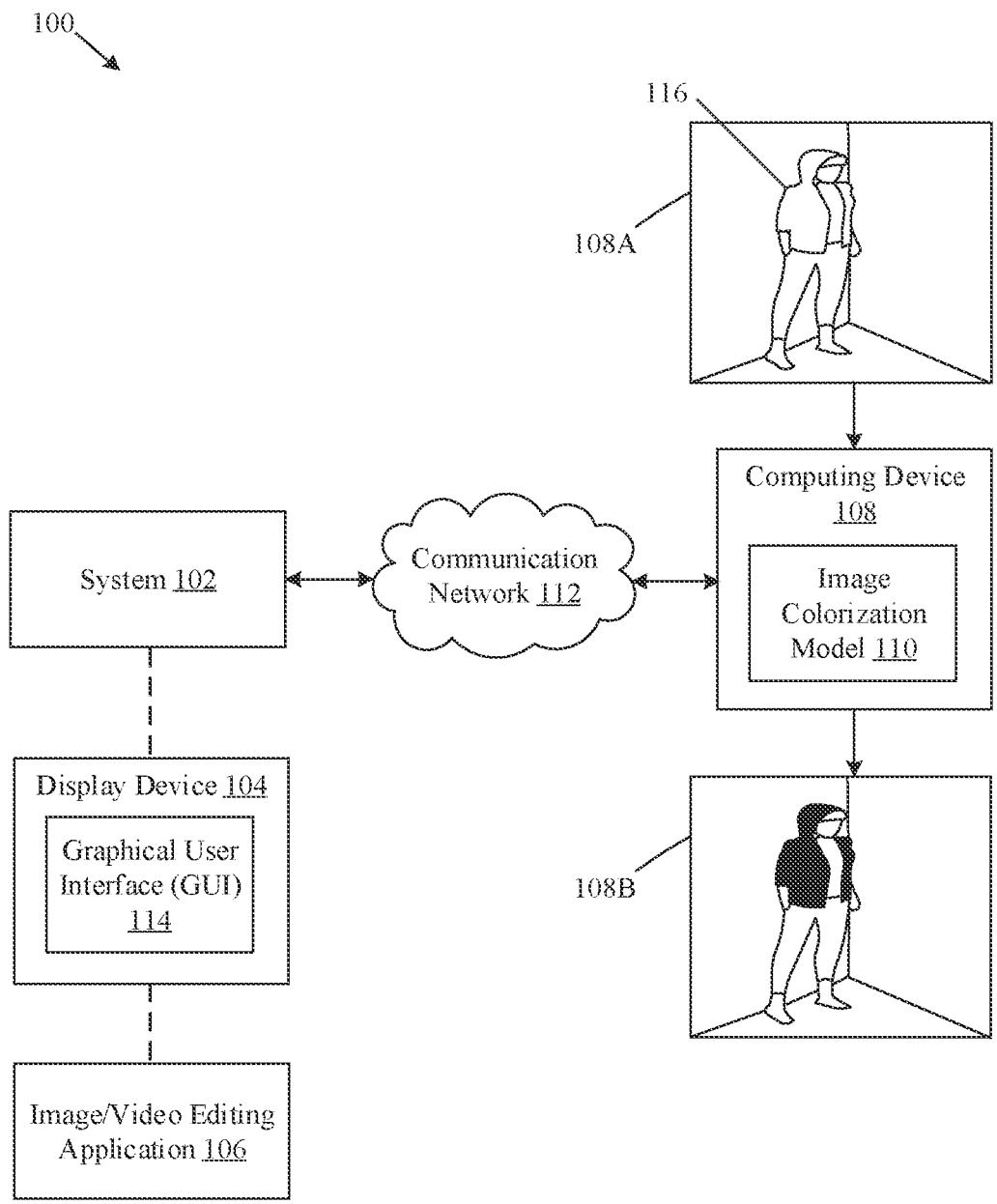
FIG. 1 is a block diagram that illustrates an exemplary network environment for node-based image colorization on an image/video editing application, in accordance with an embodiment of the disclosure.

FIG. 1 is a block diagram that illustrates an exemplary network environment for node-based image colorization on an image/video editing application, in accordance with an embodiment of the disclosure. With reference to FIG. 1, there is shown a network environment 100. The network environment 100 may include a system 102 and a display device 104 communicatively coupled to the system 102. There is further shown an image/video editing application 106, which may be installed on the system 102 or may be accessible through a web client, such as a web application or a web browser, on the system 102.

The network environment 100 may further include a computing device 108 which may host an image colorization model 110. The computing device 108 may be communicatively coupled to the system 102 via a communication network 112. In FIG. 1, the system 102 and the display device 104 are shown as two separate devices; however, in some embodiments, the entire functionality of the display device 104 may be incorporated in the computing system 102, without a deviation from the scope of the disclosure.

The system 102 may include suitable logic, circuitry, code, and/or interfaces that may be configured to execute a workflow for colorization of one or more objects in one or more grayscale images (such as a grayscale image 108A). The workflow may be associated with a software plugin, which may include program instructions for execution of the workflow on the image/video editing application 106. Examples of the system 102 may include, but are not limited to, an image/video editing machine, a server, a computer workstation, a mainframe machine, a gaming device, a smartphone, a mobile phone, a laptop, a tablet, an extended reality (XR) headset, and/or any other consumer electronic (CE) device with image/video editing capability.

The display device 104 may include suitable logic, circuitry, and/or interfaces that may be configured to display a graphical user interface (GUI) 114 of the image/video editing application 106. In one embodiment, the display device 104 may be a touch-enabled device which may enable a user to provide a user input via the display device 104. The display device 104 may include a display unit that may be realized through several known technologies such as, but not limited to, at least one of a Liquid Crystal Display (LCD) display, a Light Emitting Diode (LED) display, a plasma display, or an Organic LED (OLED) display technology, or other display technologies.

The image/video editing application 106 may include suitable logic, code and/or interfaces that may be configured to edit one or more grayscale images. For example, an edit may include application of a color effect on an input image (such as the grayscale image 108A) using the image colorization model 110. For example, an auto-style colorization model may be capable of colorizing the one or more grayscale images without a reference color image as input to the auto-style colorization. Another edit may include a transfer of the color effect from the reference color image to an object in a grayscale image (such as the grayscale image 108A) using the image colorization model 110. For example, a user-guided colorization model may require a reference color image as input to colorize the one or more grayscale images. The image/video editing application 106 may be implemented based on a node graph architecture. In the node graph architecture, a user may be able to construct a node graph to represent a workflow for any editing task, such as a colorization of the grayscale image 108A based on the selected image colorization model 110. Examples of the image/video editing application 106 may include, but are not limited to, a node-based digital compositing and visual effects application, an image editor, a digital effects application, a motion graphic editing application, a compositing application, a non-linear editing (NLE) application, a raster graphics editor, or a combination thereof.

The image colorization model 110 may be a neural network-based colorization model, which may be trained on an image colorization task to colorize objects in a single image frame or in a sequence of images frames of a grayscale image. The image colorization model 110 may be defined by its hyper-parameters, for example, activation function(s), number of weights, cost function, regularization function, input size, number of layers, and the like.

The image colorization model 110 may be referred to as a computational network or a system of artificial neurons (also referred to as nodes). The nodes of the image colorization model 110 may be arranged in a plurality of layers, as defined in a neural network topology of the image colorization model 110. The plurality of layers of the image colorization model 110 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the image colorization model 110. Outputs of each hidden layer may be coupled to inputs of at least one node in other layers of the image colorization model 110. Node(s) in the final layer may receive inputs from at least one hidden layer to output a result. The number of layers and the number of nodes in each layer may be determined from the hyper-parameters of the image colorization model 110. Such hyper-parameters may be set before or while training the image colorization model 110 on a training dataset of images.

Each node of the image colorization model 110 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the image colorization model 110. All or some of the nodes of the image colorization model 110 may correspond to same or a different mathematical function.

In training of the image colorization model 110, one or more parameters of each node of the image colorization model 110 may be updated based on whether an output of the final layer for a given input (from the training dataset) matches a correct result based on a loss function for the image colorization model 110. The above process may be repeated for the same or a different input till a minima of loss function is achieved, and a training error is minimized. Several methods for training are known in art, for example, gradient descent, stochastic gradient descent, batch gradient descent, gradient boost, meta-heuristics, and the like.

In an embodiment, the image colorization model 110 may include electronic data, which may be implemented as, for example, a software component of an application executable on the system 102 or the computing device 108. The image colorization model 110 may rely on libraries, external scripts, or other logic/instructions for execution by a processing device, such as the system 102 or the computing device 108. The image colorization model 110 may include computer-executable codes or routines to enable a computing device, such as the system 102 or the computing device 108 to perform one or more operations to colorize objects in input grayscale images. Additionally, or alternatively, the image colorization model 110 may be implemented using hardware including a processor, a microprocessor (e.g., to perform or control performance of one or more operations), a field-programmable gate array (FPGA), or an application-specific integrated circuit (ASIC). For example, an inference accelerator chip may be included in the system 102 to accelerate computations of the image colorization model 110 for the image colorization task. In some embodiments, the image colorization model 110 may be implemented using a combination of both hardware and software.

Examples of the image colorization model 110 may include, but are not limited to, an autoencoder, a convolutional neural network (CNN), Regions with CNN (R-CNN), Fast R-CNN, Faster R-CNN, a You Only Look Once (YOLO) network, a Residual Neural Network (Res-Net), a Feature Pyramid Network (FPN), a Retina-Net, and/or a combination thereof.

The computing device 108 may include suitable logic, circuitry, code, and/or interfaces that may be configured to implement the image colorization model 110 for colorization of grayscale image(s). The computing device 108 may be a cloud server and may execute operations through web applications, cloud applications, HTTP requests, repository operations, file transfer, and the like. Other example implementations of the computing device 108 may include, but are not limited to, a web server, a file transfer protocol (FTP) server, an application server, or a mainframe server.

In at least one embodiment, the computing device 108 may be implemented as a plurality of distributed cloud-based resources by use of several technologies that are well known to those ordinarily skilled in the art. A person with ordinary skill in the art will understand that the scope of the disclosure may not be limited to the implementation of the computing device 108 and the system 102 as two separate entities. In certain embodiments, the functionalities of the computing device 108 can be incorporated in its entirety or at least partially in the system 102, without a departure from the scope of the disclosure.

The communication network 112 may include a communication medium through which the system 102 may communicate with the computing device 108 and other devices which are omitted from disclosure for the sake of brevity. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may control the display device 104 to display the GUI 114 of the image/video editing application 106. The GUI 114 may include a node-based interface to create a workflow for an image processing task, such as an image colorization task. For example, a user may have to simply place a set of image processing operations as nodes on the node-based interface. Thereafter, to obtain a workflow, such image operations may be linked together by connecting such nodes together on the node-based interface. Each of these operations may together produce a node graph.

At any time-instant, the user may create a project on the image/video editing application 106. The system 102 may receive a first user input to construct the node graph via the node-based interface of the GUI 114. The system 102 may control the display device 104 to display the node graph on the GUI 114 of the image/video editing application 106. The node graph may include an input node to select one or more grayscale images (such as the grayscale image 108A), and a colorization node which represents a workflow for colorization of at least a first object (such as a jacket worn by a person 116) in the one or more grayscale images (such as the grayscale image 108A). The one or more grayscale images may be separate images or may be a part of a video. Details associated with the node graph are provided, for example, in FIG. 3.

The system 102 may receive a second user input, which may be associated with selection of a first setting of the colorization node via the image/video editing application 106. The first setting may include options to select a type of the image colorization model 110.

The system 102 may select the image colorization model 110 based on the second user input and may execute the workflow associated with the colorization node. As part of the workflow, the system 102 may transmit the one or more grayscale images to the computing device 108, which hosts the selected image colorization model 110. The computing device 108 may receive the transmitted one or more grayscale images and may apply the selected image colorization model 110 on such grayscale images to generate one or more colorized images. The system 102 may receive such colorized images (such as a colorized image 108B) from the computing device 108. The one or more colorized images may include at least the first object (such as the jacket worn by the person 116) colorized based on a color effect. In an embodiment, the color effect may appear as another node on the node-based interface of the GUI 114.

Figure 2:
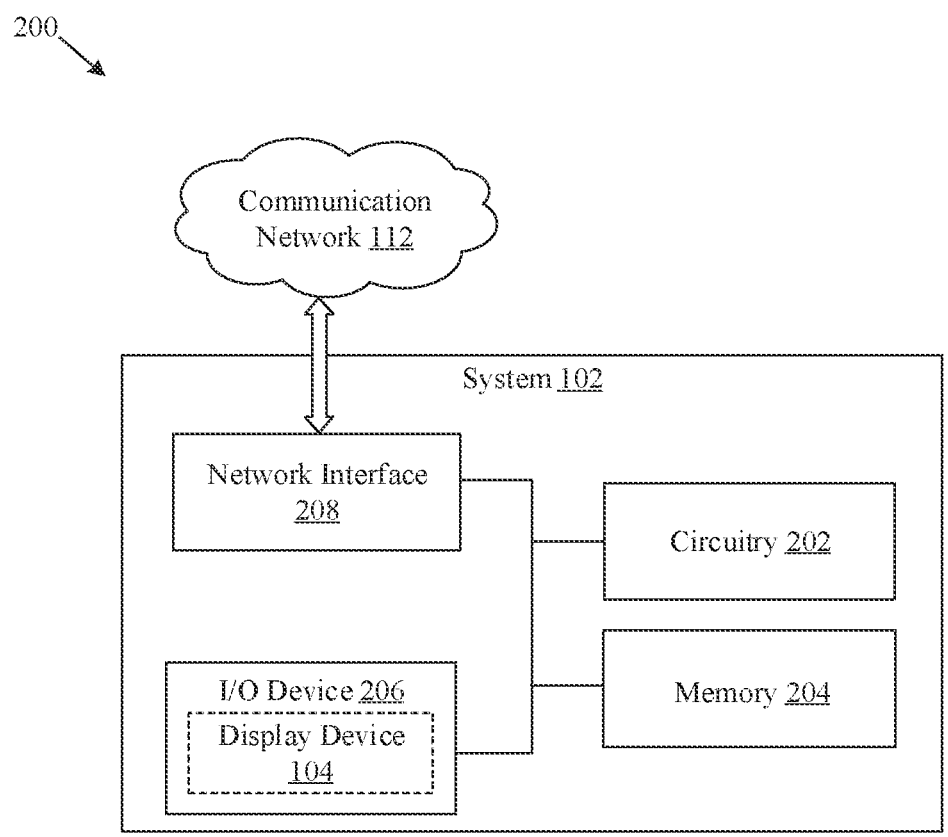
FIG. 2 is a block diagram that illustrates an exemplary system for node-based image colorization on an image/video editing application, in accordance with an embodiment of the disclosure.

FIG. 2 is a block diagram that illustrates an exemplary system for node-based image colorization on an image/video editing application, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, the Input/Output (I/O) device 206, and a network interface 208. The circuitry 202 may be communicatively coupled to the memory 204, the I/O device 206, and the network interface 208. In some embodiments, the I/O device 206 may include a display device (such as the display device 104 of FIG. 1).

The circuitry 202 may include suitable logic, circuitry, and/or interfaces that may be configured to execute program instructions associated with different operations to be executed by the system 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, code, and/or interfaces that may be configured to store the program instructions to be executed by the circuitry 202. In at least one embodiment, the memory 204 may be configured to store one or more grayscale images (such as the grayscale image 108A). The memory 204 may be further configured to store a first setting of the colorization node. The memory 204 may be further configured to store a set of color effects to be applied on the one or more grayscale images. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, code, and/or interfaces that may be configured to receive an input and provide an output based on the received input. The I/O device 206 may include various input and output devices, which may be configured to communicate with the circuitry 202. In an example, the system 102 may receive a first user input via the I/O device 206 to control a display device 104 to display a node graph on the GUI 114. In another example, the system 102 may receive a second user input associated with a first setting of the colorization node, via the I/O device 206 to select an image colorization model (such as the image colorization model 110). Examples of the I/O device 206 may include, but are not limited to, a touch screen, a keyboard, a mouse, a joystick, a display device (for example, the display device 104), a microphone, or a speaker.

The network interface 208 may include suitable logic, circuitry, interfaces, and/or code that may be configured to facilitate the circuitry 202 to communicate with the computing device 108, the display device 104 and/or other communication devices, via the communication network 112. The network interface 208 may be implemented by use of various known technologies to support wireless communication of the system 102 via communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the system 102, as described in FIG. 1, may be performed by the circuitry 202. Operations executed by the circuitry 202 are described in detail, for example, in FIGS. 3 and 4.

Figure 3:
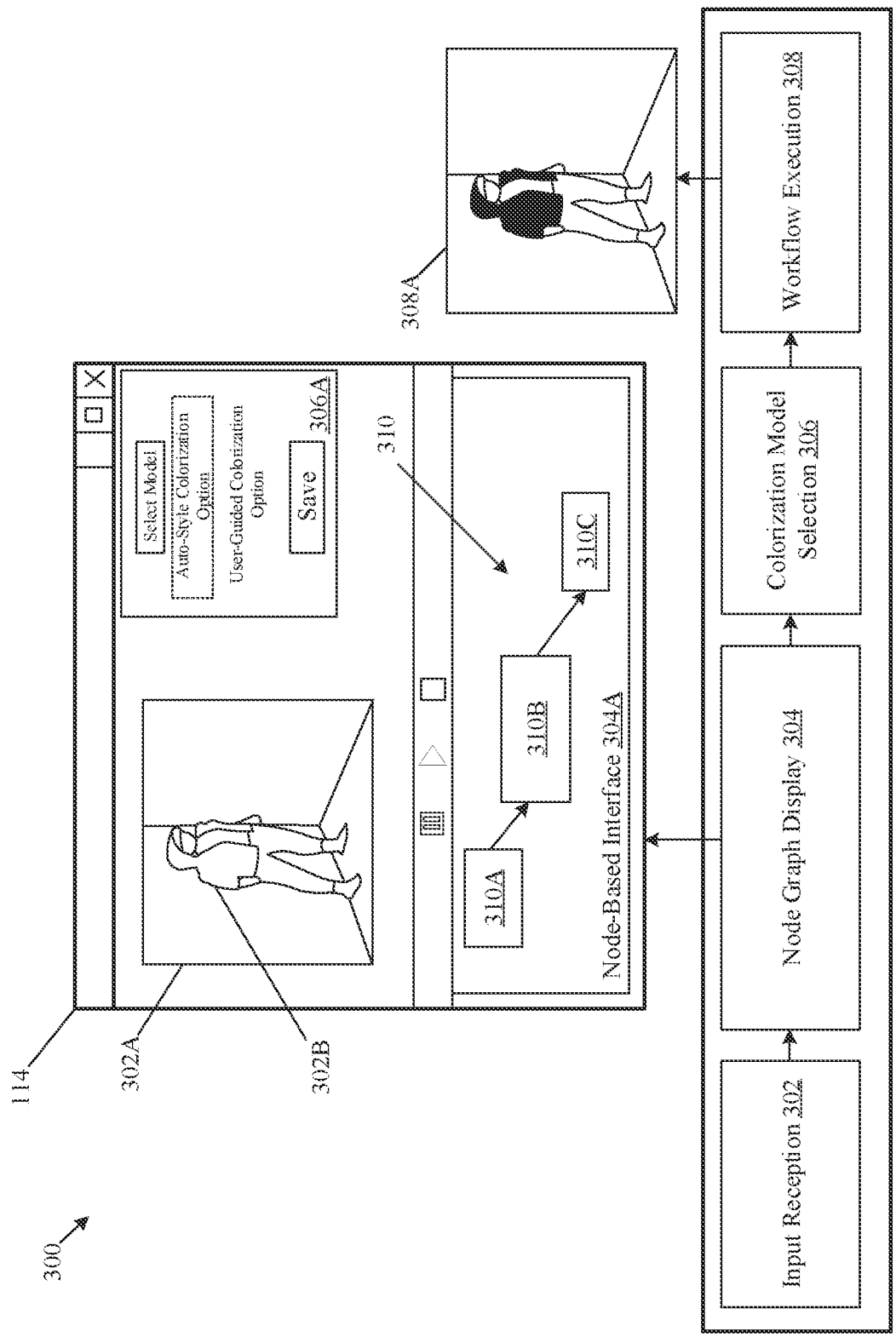
FIG. 3 is a diagram that illustrates exemplary operations for colorization of a grayscale image using an auto-style colorization plugin on an image/video editing application, in accordance with an embodiment of the disclosure.

FIG. 3 is a diagram that illustrates exemplary operations for colorization of a grayscale image using an auto-style colorization plugin on an image/video editing application, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 308, as described herein. The exemplary operations illustrated in block diagram 300 may start at 302 and may be performed by any computing system, apparatus, or device, such as by the system 102 of FIG. 1 or FIG. 2.

At 302, an input may be received. In one or more embodiments, the circuitry 202 may receive a first user input via a GUI (such as the GUI 114) of an image/video editing application (such as the image/video editing application 106). For example, the first user input may include a selection of an option to create a project on the image/video editing application 106. The first user input may also include a selection of nodes, such as an input node 310A, a colorization node 310B, and a result node 310C via a toolbar accessible on the GUI 114 of the image/video editing application 106.

At 304, a node graph 310 may be displayed. In one or more embodiments, the circuitry 202 may control a display device (such as the display device 104) to display the node graph 310 on the GUI 114 based on the first user input. For example, the GUI 114 may include a node-based interface 304A, which may be updated to include the colorization node 310B between the input node 310A, and the result node 310C. While the result node 310C may be linked to an output of the colorization node 310B, the input node 310A may be linked to the colorization node 310B and one or more grayscale images (includes the grayscale image 302A, for example).

In an embodiment, the circuitry 202 may acquire the one or more grayscale images (such as the grayscale image 302A) from a data source. The data source may be, for example, an onboard image sensor of the system 102, a persistent storage on the system 102, an image capture device, a cloud server, or a combination thereof. The grayscale image 302A may include at least a first object (such as a jacket worn by a person 302B).

The node graph 310 may include the input node 310A to select the one or more grayscale images (such as a grayscale image 302A), and the colorization node 310B which may represent (or may be linked to) a workflow for colorization of at least a first object (such as the jacket worn by the person 302B) in the one or more grayscale images (such as a grayscale image 302A). In an embodiment, the colorization node 310B may correspond to a software plugin (such as an Open FX plugin) which may include program instructions for execution of the workflow. A user may be able to select and add the software plugin as the colorization node 310B in the node-based interface 304A of the GUI 114.

At 306, an image colorization model (such as the image colorization model 110) may be selected. Before the selection is done, the circuitry 202 may control the display device 104 to display a first setting of the colorization node 310B on the GUI 114. For example, the GUI 114 may display the first setting via a first setting interface 306A, which may include a set of options corresponding to a set of image colorization models 110, such as an auto-style colorization option and a user-guided colorization option. The circuitry 202 may receive a second user input associated with a first setting of the colorization node 310B. The second user input may include, for example, a selection of a first option (such as an auto-style colorization option) from among the set of options. Thereafter, based on the received second user input, the circuitry 202 may select the image colorization model 110 from among the set of image colorization models. As shown, for example, the selected image colorization model 110 may be a neural network-based colorization model (such as the auto-style colorization model), which may be capable of colorizing the one or more grayscale images (such as the grayscale image 302A) without a reference color image as input to the selected image colorization model 110.

At 308, the workflow may be executed. At any time-instant, the circuitry 202 may execute the workflow associated with the colorization node 310B. As part of the workflow, the circuitry 202 may transmit the one or more grayscale images (such as the grayscale image 302A) to a computing device (such as the computing device 108) which may host the selected image colorization model 110 (such as the auto-style colorization model).

The computing device 108 may receive the one or more grayscale images (such as the grayscale image 302A) and may apply the selected neural network-based colorization model (such as the auto-style colorization model) on the received one or more grayscale images (such as the grayscale image 302A) to generate the one or more colorized images (such as a colorized image 308A). Each of the one or more colorized images (such as the colorized image 308A) may include at least the first object (such as the jacket worn by the person 302B) colorized based on a color effect. In an embodiment, the neural network-based colorization model (such as the auto-style colorization model) may apply the color effect to at least the first object (such as the person 302B) in each of the one or more grayscale images, to output the one or more colorized images (such as the colorized image 308A). As shown, for example, a black color may be applied as the color effect to the white-colored jacket worn by the person 302B in the grayscale image 302A. The color effect applied on the one or more grayscale images (such as the grayscale image 302A) may include modification of color values in one or more color channels of the one or more grayscale images. By way of example, and not limitation, the application of the color effect may modify at least one of: a color saturation, a brightness, a contrast, color values in specific color channels of the one or more grayscale images, a gamma or tonal change of the at least the first object (such as the jacket worn by the person 302B) in the one or more grayscale images (such as the grayscale image 302A). The application of the color effect may include an application of a filter, for example, a hue shift operation, an alpha blending, an alpha compositing operator, and the like. The color effect may be selected via a menu displayed on the GUI 114 of the image/video editing application 106.

The circuitry 202 may receive from the computing device 108, one or more colorized images (such as the colorized image 308A). Each of the one or more colorized images may include at least the first object (such as the jacket worn by the person 302B) colorized based on the color effect. In an embodiment, the circuitry 202 may control the display device 104 to display the colorized image 308A on the GUI 114 of the image/video editing application 106.

Although illustrated with discrete blocks, the exemplary operations associated with one or more blocks of the block diagram 300 may be divided into additional blocks, combined into fewer blocks, or eliminated, depending on implementation of the exemplary operations.

Figure 4:
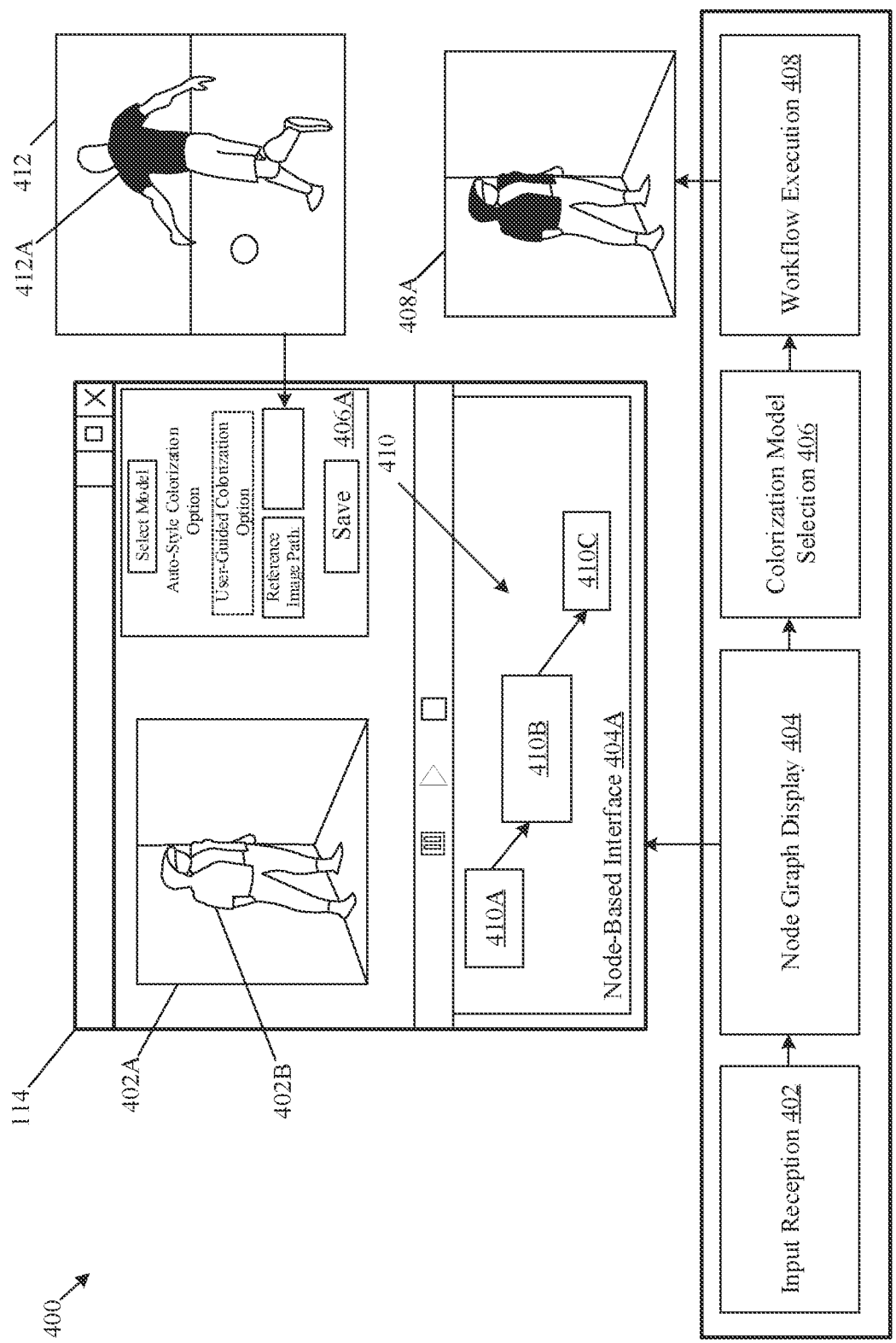
FIG. 4 is a diagram that illustrates exemplary operations for colorization of a grayscale image using a user-guided colorization plugin on an image/video editing application, in accordance with an embodiment of the disclosure.

FIG. 4 is a diagram that illustrates exemplary operations for colorization of a grayscale image using a user-guided colorization plugin on an image/video editing application, in accordance with an embodiment of the disclosure. FIG. 4 is explained in conjunction with elements from FIGS. 1, 2, and 3. With reference to FIG. 4, there is shown a block diagram 400 that illustrates exemplary operations from 402 to 408, as described herein. The exemplary operations illustrated in block diagram 400 may start at 402 and may be performed by any computing system, apparatus, or device, such as the system 102 of FIG. 1 or FIG. 2.

At 402, an input may be received. In one or more embodiments, the circuitry 202 may receive a first user input via a GUI (such as the GUI 114) of an image/video editing application (such as the image/video editing application 106), as described, for example at 302 of FIG. 3.

At 404, a node graph 410 may be displayed. In one or more embodiments, the circuitry 202 may control a display device (such as the display device 104) to display the node graph 410 on the GUI 114 based on the first user input. The node graph 410 may include an input node 410A to select one or more grayscale images (such as a grayscale image 402A), and a colorization node 410B which may represent (or may be linked to) a workflow for colorization of at least a first object (such as a jacket worn by a person 402B) in the one or more grayscale images (such as the grayscale image 402A). For example, the GUI 114 may include a node-based interface 404A, which may be updated to include the colorization node 410B between the input node 410A, and the result node 410C. Details of the node graph 410 is described for example at 304 of FIG. 3.

At 406, an image colorization model (such as the image colorization model 110) may be selected. Before the selection is made, the circuitry 202 may control the display device 104 to display a first setting of the colorization node 410B on the GUI 114 of the image/video editing application 106. For example, the GUI 114 may include a first setting interface 406A, which may include a set of options corresponding to a set of image colorization models 110 (such as an auto-style colorization option and a user-guided colorization option).

In one or more embodiments, the circuitry 202 may receive a second user input associated with the first setting of the colorization node 410B. For example, the second user input may include a selection of a second option (such as the user-guided colorization option). The circuitry 202 may select the image colorization model 110 from among the set of image colorization models, based on the received second user input. As shown, for example, the image colorization model 110 may be a neural network-based colorization model (such as the user-guided colorization model), which may require a reference color image (such as a reference color image 412) as input to colorize the one or more grayscale images (such as the grayscale image 402A).

In an embodiment, the circuitry 202 may control the display device 104 to display a second setting of the colorization node 410B on the GUI 114 of the image/video editing application 106. For example, the second setting may be displayed based on a user selection of an option displayed along with the colorization node 410B. The second setting may include a file path or a link to a reference color image that includes a region of interest. The circuitry 202 may receive a third user input associated with the second setting of the colorization node 410B. Based on the received third user input, the circuitry 202 may select the reference color image 412 including the region of interest (such as a shirt of a soccer-player 412A).

The reference color image 412 may be loaded on the GUI 114 of the image/video editing application 106. The reference color image 412 may be a color image with at least one object of interest, for example, the soccer-player 412A. In an embodiment, the circuitry 202 may select the region of interest (such as the shirt of the soccer-player 412A) in the reference color image 412 based on a fourth user input via the GUI 114. For example, the reference color image 412 may be loaded on the GUI 114 and a segmentation tool or a marker tool of the image/video editing application 106 may be used to select the region of interest. Detailed implementation of a segmentation tool may be known to one skilled in the art, and therefore, a detailed description of the segmentation tool has been omitted from the disclosure for the sake of brevity. The selection of the region of interest may be displayed as a node in the node-based interface 404A of the GUI 114.

At 408, the workflow may be executed. At any time-instant, the circuitry 202 may execute the workflow associated with the colorization node 410B. As part of the workflow execution, the circuitry 202 may transmit the selected reference color image (such as the reference color image 412) and the one or more grayscale images (such as the grayscale image 402A) to a computing device (such as the computing device 108) which may host the selected image colorization model 110 (such as a user-guided colorization model).

The computing device 108 may receive the selected reference color image 412 and the one or more grayscale images (such as the grayscale image 402A). Thereafter, the computing device 108 may apply the selected neural network-based colorization model (such as the user-guided colorization model) to the one or more grayscale images (such as the grayscale image 302A) to transfer the color effect of the region of interest (such as the shirt of the soccer-player 412A) to at least the first object (such as the jacket worn by the person 402B) in the one or more grayscale images, to output one or more colorized images (such as a colorized image 408A). As shown, for example, the black color on the shirt of the soccer-player 412A (i.e., the region of interest) may be transferred to the jacket worn by the person 402B in the grayscale image 402A.

The circuitry 202 may receive from the computing device 108, the one or more colorized images (such as the colorized image 408A) including at least the first object (such as the jacket worn by the person 402B) colorized based on the color effect of the region of interest (such as the shirt of the soccer-player 412A). In an embodiment, the application of the color effect may include operations, for example, a hue shift operation, an alpha blending or alpha compositing operation, and the like. The color effect may be selected via a menu displayed on the GUI 114 of the image/video editing application 106.

In an embodiment, the circuitry 202 may control the display device 104 to display the colorized image 408A on the GUI 114 of the image/video editing application 106. The image/video editing application 106 may allow an end user to control and modify the reference color image 412 using the color effect. The reference color image 412 may be saved on the system 102, to be later used to colorize the remaining grayscale images.

Although illustrated with discrete blocks, the exemplary operations associated with one or more blocks of the block diagram 400 may be divided into additional blocks, combined into fewer blocks, or eliminated, depending on implementation of the exemplary operations.

Figure 5:
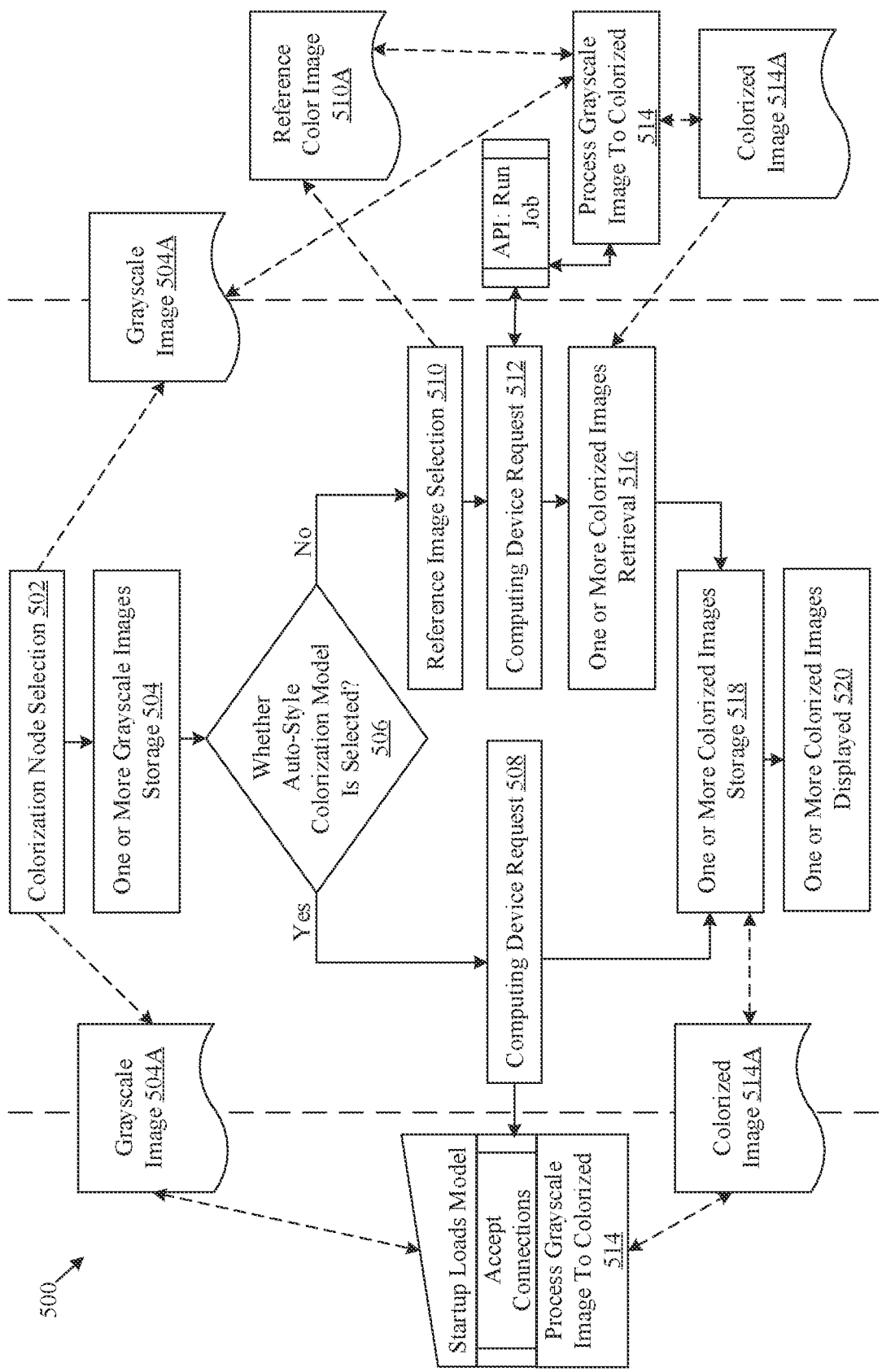
FIG. 5 is a flowchart that illustrates an exemplary operations for node-based image colorization on an image/video editing application, in accordance with an embodiment of the disclosure.

FIG. 5 is a flowchart that illustrates an exemplary operation for node-based image colorization on an image/video editing application, in accordance with an embodiment of the disclosure. FIG. 5 is explained in conjunction with elements of FIGS. 1, 2, 3, and 4. With reference to FIG. 5, there is a flowchart 500 that illustrates operations from 502 to 520, as described herein. The exemplary operations illustrated in flowchart 500 may start at 502 and may be performed by any computing system, apparatus, or device, such as the system 102 of FIG. 1 or FIG. 2.

At 502, a colorization node (such as the colorization node 310B) may be selected. On the image/video editing application 106, the user may select the colorization node 310B for execution of a workflow associated with the colorization node 310B via the GUI 114 of the image/video editing application 106. The colorization node 310B may correspond to a software plugin (such as an OpenFX (OFX) plugin) which, when executed, on the image/video editing application 106 (such as a Nuke application) may invoke an image colorization model (such as the image colorization model 110) to apply a color effect on object(s) in one or more grayscale images (such as a grayscale image 504A).

At 504, the one or more grayscale images (such as the grayscale image 504A) may be stored. In an embodiment, the circuitry 202 may receive a first user input via the GUI 114 of the image/video editing application 106 and may control the display device 104 to display a node graph (such as the node graph 310) on the GUI 114 based on the first user input. The node graph 310 may include an input node (such as the input node 310A) to select the one or more grayscale images, and the selected colorization node 310B. Details associated with the node graph 310 are provided, for example, in FIG. 3. The circuitry 202 may store the one or more grayscale images received from the image/video editing application 106, in memory (such as the memory 204) of the system 102.

In an embodiment, the circuitry 202 may receive a second user input with a first setting of the colorization node 310B and select the image colorization model 110 based on the received second user input. Details associated with the selection of the image colorization model 110 are provided, for example, in FIG. 3.

At 506, it may be determined whether an auto-style image colorization model or a user-guided colorization model is selected as the image colorization model 110. If the selected image colorization model 110 is the auto-style colorization model, control may pass to 508. Otherwise, if the selected image colorization model 110 is the user-guided colorization model, control may pass to 510.

At 508, a computing device (such as the computing device 108) may be invoked. In an embodiment, the circuitry 202 may execute the workflow associated with the colorization node 310B. As part of the workflow execution, the circuitry 202 may invoke the computing device 108 and may transmit the one or more grayscale images to the computing device 108 which may host the selected image colorization model 110 (such as the auto-style colorization model). The auto-style colorization model may be a neural network-based colorization model, capable of colorizing the one or more grayscale images (such as the grayscale image 504A) without a reference color image as input to the auto-style colorization model.

The computing device 108 may receive the one or more grayscale images (such as the grayscale image 504A) and may apply the selected image colorization model 110 (such as the auto-style colorization model) on the one or more grayscale images (such as the grayscale image 504A) to generate one or more colorized images (such as a colorized image 514A). Control may pass to 514.

At 510, a reference color image (such as a reference color image 510A) may be selected. In an embodiment, the circuitry 202 may receive a third user input associated with a second setting of the colorization node 310B. The circuitry 202 may select the reference color image 510A including a region of interest (such as the shirt of the soccer-player 412A) based on the third user input. Details associated with the reference color image 510A is provided for example, in FIG. 4.

At 512, a computing device (such as the computing device 108) may be invoked through an application programming interface (API) call. In an embodiment, the circuitry 202 may execute the workflow associated with the colorization node 310B. As part of the workflow execution, the circuitry 202 may invoke the computing device 108 through the API call and may transmit (with the API call) the one or more grayscale images and the selected reference color image 510A to the computing device 108, that may host the selected image colorization model 110 (such as the user-guided colorization model). The user-guided colorization model may be a neural network-based colorization model, which requires the reference color image 510A as input to colorize the one or more grayscale images (such as the grayscale image 504A).

The computing device 108 may receive the selected reference color image 510A and the one or more grayscale images (such as the grayscale image 504A). At 514, the computing device 108 may process the one or more grayscale images (frame-by-frame) by application of the selected image colorization model 110 (such as the user-guided colorization model) on the one or more grayscale images (such as the grayscale image 504A). In case the auto-style model is the selected image colorization model 110, the one or more grayscale images may be colorized without the reference color image 510A. In case the user-guided model is the selected image colorization model 110, the color effect of the region of interest in the reference color image 510A may be transferred to at least a first object in the one or more grayscale images.

At 516, the one or more colorized images (such as the colorized image 514A) may be received. In an embodiment, the circuitry 202 may receive from the computing device 108, one or more colorized images (such as the colorized image 514A) including at least the first object (such as the jacket worn by the person 302B) colorized based on the color effect. Details associated with the color effect are provided, for example, in FIG. 3.

At 518, the one or more colorized images (such as the colorized image 514A) may be stored. In an embodiment, the circuitry 202 may be configured to store the one or more colorized images in a buffer memory. In an embodiment, the memory 204 may be configured to allocate the buffer memory in the memory 204 as and when the one or more colorized images are required to be stored. In another embodiment, the buffer memory may be a memory module that may be separate from the memory 204.

In an embodiment, the circuitry 202 may be configured to store the one or more colorized images in the buffer memory for a duration while all the grayscale images are colorized based on the color effect. This may allow the system 102 to display all the colorized image(s) onto the GUI 114 of the image/video editing application 106 seamlessly.

At 520, the one or more colorized images (such as the colorized image 514A) may be displayed. In an embodiment, the circuitry 202 may control the display device 104 to display the one or more colorized images (such as the colorized image 514A) onto the GUI 114 of the image/video editing application 106.

Although illustrated with discrete blocks, the exemplary operations associated with one or more blocks of the flowchart 500 may be divided into additional blocks, combined into fewer blocks, or eliminated, depending on implementation of the exemplary operations.

Figure 6:
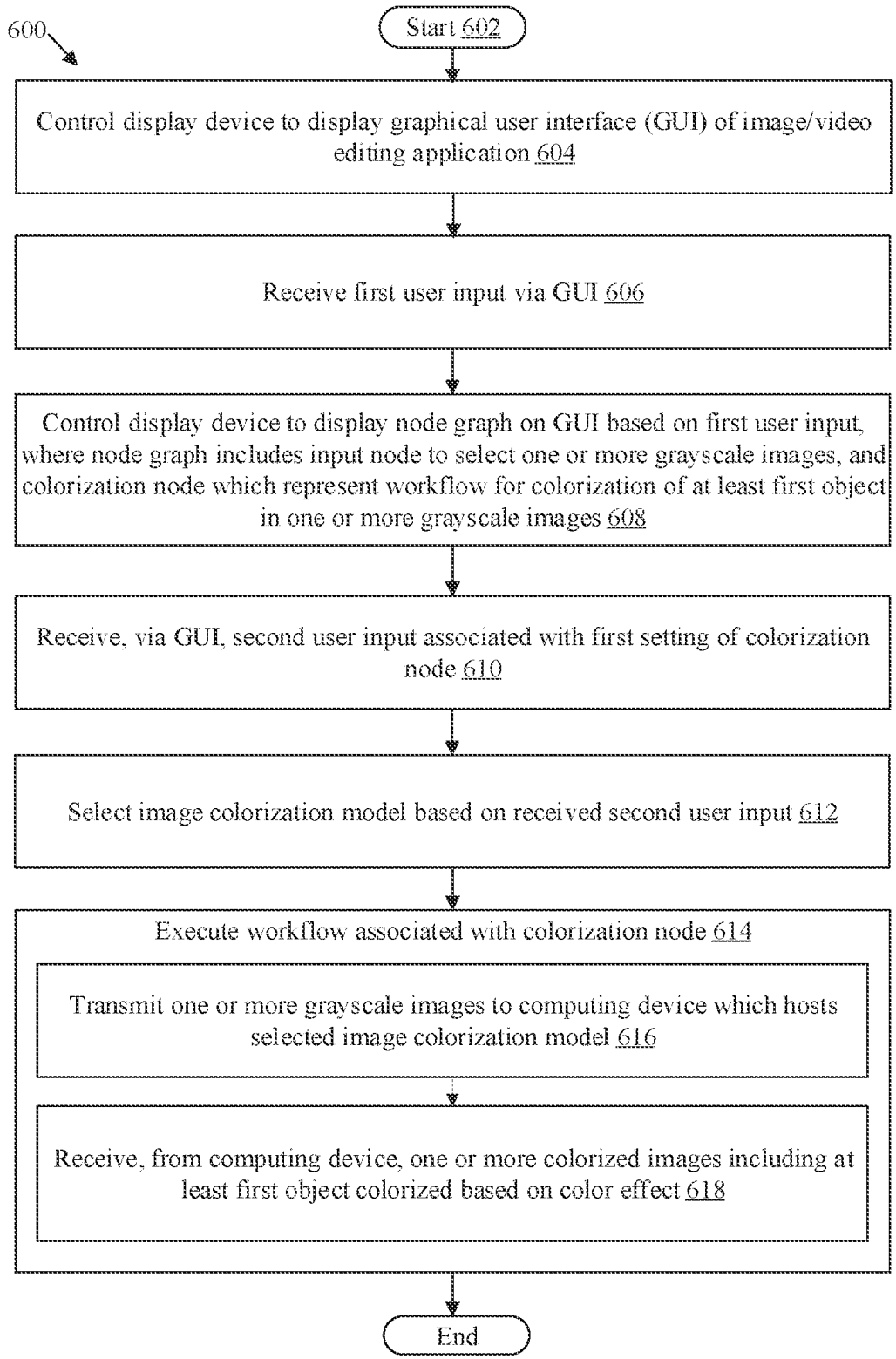
FIG. 6 is a flowchart that illustrates an exemplary method for node-based image colorization on an image/video editing application, in accordance with an embodiment of the disclosure.

FIG. 6 is a flowchart that illustrates an exemplary method for node-based image colorization on an image/video editing application, in accordance with an embodiment of the disclosure. FIG. 6 is explained in conjunction with elements from FIGS. 1, 2, 3, 4, and 5. With reference to FIG. 6, there is shown a flowchart 600. The method illustrated in the flowchart 600 may be executed by any computing system, such as by the system 102 or the circuitry 202. The method may start at 602 and proceed to 604.

At 604, a display device (such as the display device 104) may be controlled to display a GUI (such as the GUI 114) of an image/video editing application (such as the image/video editing application 106). In an embodiment, the circuitry 202 may be configured to control the display device to display the GUI.

At 606, a first user input may be received via the GUI. In one or more embodiments, the circuitry 202 may be configured to receive the first user input via a GUI (such as the GUI 114) of an image/video editing application (such as the image/video editing application 106).

At 608, the display device 104 may be controlled to display a node graph (such as the node graph 310). In one or more embodiments, the circuitry 202 may be configured to control the display device 104 to display the node graph 310 on the GUI 114 based on the first user input. The node graph 310 may include an input node (such as the input node 310A) to select one or more grayscale images (such as the grayscale image 302A) and a colorization node (such as the colorization node 310B) representing a workflow for colorization of at least a first object (such as the person 302B) in the one or more grayscale images 302A (as described, for example, in FIG. 3).

At 610, a second user input may be received via the GUI. In one or more embodiments, the circuitry 202 may be configured to receive the second user input associated with a first setting of the colorization node 310B (as described, for example, in FIG. 3).

At 612, an image colorization model (such as the image colorization model 110) may be selected. In one or more embodiments, the circuitry 202 may be configured to select the image colorization model 110 based on the received second user input. Details of selection of the image colorization model 110 are described, for example, in FIG. 3.

At 614, a workflow may be executed. In one or more embodiments, the circuitry 202 may be configured to execute the workflow associated with the colorization node (such as the colorization node 310B). Details of the execution of the workflow are described, for example, in FIG. 3.

At 616, the one or more grayscale images (such as the grayscale image 302A) may be transmitted to a computing device (such as the computing device 108). In one or more embodiments, the circuitry 202 may be configured to transmit the one or more grayscale images (such as the grayscale image 302A) to the computing device 108, which hosts the selected image colorization model 110, as described, for example, in FIG. 3.

At 618, one or more colorized images (such as the colorized image 308A) may be received. In one or more embodiments, the circuitry 202 may be configured to receive from the computing device 108, the one or more colorized images (such as the colorized image 308A) including at least the first object (such as the jacket worn by the person 302B) colorized based on a color effect. Details of the colorization of the one or more grayscale images are described, for example, in FIG. 3. Control may pass to end.

Although the flowchart 600 is illustrated as discrete operations, such as 602, 604, 606, 608, 610, 612, 614, 616, and 618, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (such as the system 102). Such instructions may cause the machine and/or computer to perform operations that include retrieval of a first user input via a GUI (such as the GUI 114) of an image/video editing application (such as the image/video editing application 106). The operations may further include control of a display device (such as the display device 104) to display a node graph (such as the node graph 310) on the GUI 114 based on the received first user input. The node graph 310 may include an input node (such as the input node 310A) to select one or more grayscale images (such as the grayscale image 302A), and a colorization node (such as the colorization node 310B) which represents a workflow for colorization of at least a first object (such as the jacket worn by the person 302B) in the one or more grayscale images (such as the grayscale image 302A). The operations may further include retrieval of a second user input associated with a first setting of the colorization node 310B. The operations may further include selection of an image colorization model (such as the image colorization model 110) based on the received second user input. The operations may further include execution of the workflow associated with the colorization node 310B to transmit the one or more grayscale images (such as the grayscale image 302A) to a computing device (such as the computing device 108) which hosts the selected image colorization model 110, and receive, from the computing device 108, one or more colorized images (such as the colorized image 308A) including at least the first object (such as the jacket worn by the person 302B) colorized based on a color effect.

Exemplary aspects of the disclosure may provide a system (such as the system 102 of FIG. 1) that includes circuitry (such as the circuitry 202). The circuitry 202 may be configured to control a display device (such as the display device 104) to display a GUI (such as the GUI 114) of an image/video editing application (such as the image/video editing application 106). The circuitry 202 may be further configured to receive a first user input via the image/video editing application and control the display device 104 to display a node graph (such as the node graph 310) on the GUI 114 based on the received first user input. The node graph 310 may include an input node (such as the input node 310A) to select one or more grayscale images (such as the grayscale image 302A), and a colorization node (such as the colorization node 310B) which represents a workflow for colorization of at least a first object (such as the jacket worn by the person 302B) in the one or more grayscale images (such as the grayscale image 302A). The circuitry 202 may be configured to receive a second user input associated with a first setting of the colorization node 310B. The circuitry 202 may be configured to select an image colorization model (such as the image colorization model 110) based on the received second user input. The circuitry 202 may be configured to execute the workflow associated with the colorization node 310B to transmit the one or more grayscale images (such as the grayscale image 302A) to a computing device (such as the computing device 108) which hosts the selected image colorization model 110, and receive, from the computing device 108, one or more colorized images (such as the colorized image 308A) including at least the first object (such as the jacket worn by the person 302B) colorized based on a color effect.

In accordance with an embodiment, the colorization node 310B corresponds to a software plugin which includes program instructions for execution of the workflow.

In accordance with an embodiment, the selected image colorization model 110 may be a neural network-based colorization model (such as the auto-style colorization model), which may be capable of colorizing the one or more grayscale images (such as the grayscale image 302A) without a reference color image as input to colorize the one or more grayscale images (such as the grayscale image 302A).

In accordance with an embodiment, the circuitry 202 may be further configured to receive the one or more grayscale images (such as the grayscale image 302A). The circuitry 202 may be further configured to apply the selected image colorization model 110 on the one or more grayscale images (such as the grayscale image 302A) to generate the one or more colorized images (such as the colorized image 308A).

In accordance with an embodiment, the selected image colorization model 110 may be a neural network-based colorization model (such as the user-guided colorization model), which requires a reference color image (such as the reference color image 412) as input to colorize the one or more grayscale images (such as the grayscale image 402A).

In accordance with an embodiment, the circuitry 202 may be further configured to receive a third user input associated with a second setting of the colorization node 410B. The circuitry 202 may be further configured to select a reference color image 412 including a region of interest (such as the shirt of the soccer-player 412A) based on the third user input. The circuitry 202 may be further configured to execute the workflow associated with the colorization node 4108 to further transmit the selected reference color image 412 to the computing device 108. The computing device 108 may receive the selected reference color image 412 and the one or more grayscale images (such as the grayscale image 402A), and apply the selected image colorization model 110 to the one or more grayscale images (such as the grayscale image 402A) to transfer the color effect of the region of interest (such as the shirt of the soccer-player 412A) to at least the first object (such as the jacket worn by the person 402B) in the one or more grayscale images (such as the grayscale image 402A).

In accordance with an embodiment, the circuitry 202 may be further configured to control the display device 104 to display the one or more colorized images (such as the colorized image 308A) onto the GUI 114 of the image/video editing application 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
  circuitry configured to:
   control a display device to display a Graphical User Interface (GUI) of an image/video editing application;
   receive a first user input via the Graphical User Interface (GUI);
   control the display device to display a node graph on the GUI based on the first user input, wherein the node graph comprises:
    an input node to select one or more grayscale images, and
    a colorization node which represents a workflow for colorization of at least a first object in the one or more grayscale images;
   receive, via the GUI, a second user input associated with a first setting of the colorization node;
   select an image colorization model based on the received second user input; and
   execute the workflow associated with the colorization node to:
    transmit the one or more grayscale images to a computing device which hosts the selected image colorization model, and
    receive, from the computing device, one or more colorized images comprising at least the first object colorized based on a color effect.

2. The system according to claim 1, wherein the colorization node corresponds to a software plugin which includes program instructions for execution of the workflow.

3. The system according to claim 1, wherein the selected image colorization model is a neural network-based colorization model, which is capable of colorizing the one or more grayscale images without a reference color image as input to the selected image colorization model.

4. The system according to claim 3, wherein the computing device:
  receives the one or more grayscale images; and
  applies the selected image colorization model on the one or more grayscale images to generate the one or more colorized images.

5. The system according to claim 1, wherein the selected image colorization model is a neural network-based colorization model, which requires a reference color image as input to colorize the one or more grayscale images.

6. The system according to claim 5, wherein the circuitry is further configured to:
  receive a third user input associated with a second setting of the colorization node;
  select a reference color image comprising a region of interest based on the third user input;
  execute the workflow associated with the colorization node to further transmit the selected reference color image to the computing device, wherein the computing device:
   receives the selected reference color image and the one or more grayscale images; and
   applies the selected image colorization model to the one or more grayscale images to transfer the color effect of the region of interest to at least the first object in the one or more grayscale images.

7. The system according to claim 1, wherein the circuitry is further configured to control the display device to display the one or more colorized images onto the GUI of the image/video editing application.

8. A method, comprising:
  controlling a display device to display a Graphical User Interface (GUI) of an image/video editing application;
  receiving a first user input via the Graphical User Interface (GUI);
  controlling the display device to display a node graph on the GUI based on the first user input, wherein the node graph comprises:
   an input node to select one or more grayscale images, and
   a colorization node which represents a workflow for colorization of at least a first object in the one or more grayscale images;
  receiving, via the GUI, a second user input associated with a first setting of the colorization node;
  selecting an image colorization model based on the received second user input; and
  executing the workflow associated with the colorization node, wherein the execution comprises:
   transmitting the one or more grayscale images to a computing device which hosts the selected image colorization model, and
   receiving, from the computing device, one or more colorized images comprising at least the first object colorized based on a color effect.

9. The method according to claim 8, wherein the colorization node corresponds to a software plugin which includes program instructions for execution of the workflow.

10. The method according to claim 8, wherein the selected image colorization model is a neural network-based colorization model, which is capable of colorizing the one or more grayscale images without a reference color image as input to the selected image colorization model.

11. The method according to claim 10, wherein the computing device comprising:
  receiving the one or more grayscale images; and
  applying the selected image colorization model on the one or more grayscale images to generate the one or more colorized images.

12. The method according to claim 8, wherein the selected image colorization model is a neural network-based colorization model, which requires a reference color image as input to colorize the one or more grayscale images.

13. The method according to claim 12, further comprising:
  receiving a third user input associated with a second setting of the colorization node;
  selecting a reference color image comprising a region of interest based on the third user input;
  executing the workflow associated with the colorization node to further transmit the selected reference color image to the computing device;
  receiving, by the computing device, the selected reference color image and the one or more grayscale images; and
  applying, by the computing device, the selected image colorization model to the one or more grayscale images to transfer the color effect of the region of interest to at least the first object in the one or more grayscale images.

14. The method according to claim 8, further comprising controlling the display device to display the one or more colorized images onto the GUI of the image/video editing application.

15. A non-transitory computer-readable medium having stored thereon, computer-executable instructions which, when executed a system, causes the system to execute operations, the operations comprising:

controlling a display device to display a Graphical User Interface (GUI) of an image/video editing application;

receiving a first user input via the Graphical User Interface (GUI);

controlling the display device to display a node graph on the GUI based on the first user input, wherein the node graph comprises:
an input node to select one or more grayscale images, and
a colorization node which represents a workflow for colorization of at least a first object in the one or more grayscale images;

receiving, via the GUI, a second user input associated with a first setting of the colorization node;

selecting an image colorization model based on the received second user input; and executing the workflow associated with the colorization node, wherein the execution comprises:
transmitting the one or more grayscale images to a computing device which hosts the selected image colorization model, and
receiving, from the computing device, one or more colorized images comprising at least the first object colorized based on a color effect.

16. The non-transitory computer-readable medium according to claim 15, wherein the colorization node corresponds to a software plugin which includes program instructions for execution of the workflow.

17. The non-transitory computer-readable medium according to claim 15, wherein the selected image colorization model is a neural network-based colorization model, which is capable of colorizing the one or more grayscale images without a reference color image as input to the selected image colorization model.

18. The non-transitory computer-readable medium according to claim 17, wherein the computing device comprising:

receiving the one or more grayscale images; and applying the selected image colorization model on the one or more grayscale images to generate the one or more colorized images.

19. The non-transitory computer-readable medium according to claim 15, wherein the selected image colorization model is a neural network-based colorization model, which requires a reference color image as input to colorize the one or more grayscale images.

20. The non-transitory computer-readable medium according to claim 19, further comprising:

receiving a third user input associated with a second setting of the colorization node;

selecting a reference color image comprising a region of interest based on the third user input;

executing the workflow associated with the colorization node to further transmit the selected reference color image to the computing device;

receiving, by the computing device, the selected reference color image and the one or more grayscale images; and applying, by the computing device, the selected image colorization model to the one or more grayscale images to transfer the color effect of the region of interest to at least the first object in the one or more grayscale images.

* * * * *